(12) United States Patent
Back et al.

(10) Patent No.: US 11,174,403 B2
(45) Date of Patent: Nov. 16, 2021

(54) INKJET INK COMPOSITION FOR 3D PRINTING

(71) Applicant: LG Chem, Ltd., Seoul (KR)

(72) Inventors: Seunga Back, Daejeon (KR); Sungeun Park, Daejeon (KR); Joonhyung Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/765,068

(22) PCT Filed: Dec. 26, 2018

(86) PCT No.: PCT/KR2018/016616
§ 371 (c)(1),
(2) Date: May 18, 2020

(87) PCT Pub. No.: WO2019/132488
PCT Pub. Date: Jul. 4, 2019

(65) Prior Publication Data
US 2021/0115275 A1  Apr. 22, 2021

(30) Foreign Application Priority Data

Dec. 26, 2017 (KR) .................. 10-2017-0179976

(51) Int. Cl.
| C08F 2/46 | (2006.01) |
| C08F 2/50 | (2006.01) |
| C08G 61/04 | (2006.01) |
| C09D 11/101 | (2014.01) |
| B33Y 70/00 | (2020.01) |
| B29C 64/112 | (2017.01) |
| C09D 11/107 | (2014.01) |
| C09D 11/38 | (2014.01) |

(52) U.S. Cl.
CPC .......... *C09D 11/101* (2013.01); *B29C 64/112* (2017.08); *B33Y 70/00* (2014.12); *C09D 11/107* (2013.01); *C09D 11/38* (2013.01)

(58) Field of Classification Search
CPC .............. C08F 2/46; C08F 2/50; C08G 61/04
USPC ................. 522/64, 6, 189, 184, 71, 1; 520/1
See application file for complete search history.

(56) References Cited

U.S. PATENT DOCUMENTS

| 2014/0275317 | A1 | 9/2014 | Moussa |
| 2015/0165679 | A1* | 6/2015 | Goto ..................... B29C 64/165 |
| | | | 264/308 |
| 2016/0114529 | A1 | 4/2016 | Nakamura |
| 2017/0121542 | A1 | 5/2017 | Xu et al. |
| 2017/0137643 | A1 | 5/2017 | Hirade et al. |
| 2018/0079923 | A1 | 3/2018 | Umebayashi |
| 2018/0215937 | A1 | 8/2018 | Kim et al. |
| 2018/0264716 | A1 | 9/2018 | Kiyosada |
| 2018/0281293 | A1* | 10/2018 | Kim ..................... C07D 251/30 |
| 2019/0002718 | A1 | 1/2019 | Choi et al. |

FOREIGN PATENT DOCUMENTS

| JP | H07228644 A | 8/1995 |
| JP | 2012255123 A | 12/2012 |
| JP | 2015078255 A | 4/2015 |
| JP | 2016078405 A | 5/2016 |
| JP | 2016517367 A | 6/2016 |
| JP | 2016163992 A | 9/2016 |
| JP | 2016196134 A | 11/2016 |
| JP | 201731495 A | 2/2017 |
| JP | 2017048288 A | 3/2017 |
| JP | 2017088805 A | 5/2017 |
| JP | 2018523589 A | 8/2018 |
| JP | 2018529551 A | 10/2018 |
| KR | 20120137258 A | 12/2012 |
| KR | 20150052046 A | 5/2015 |
| KR | 20170010672 A | 2/2017 |
| KR | 20170052046 A | 5/2017 |
| KR | 20170075931 A | 7/2017 |
| KR | 20170123947 A | 11/2017 |
| KR | 101869169 B1 | 6/2018 |
| WO | 2016125816 A1 | 8/2016 |
| WO | 2016199611 A1 | 12/2016 |
| WO | WO-2017078332 A1 * | 5/2017 ............. B33Y 10/00 |

OTHER PUBLICATIONS

International Search Report for Application No. PCT/KR2018/016616 dated Apr. 29, 2019.

* cited by examiner

*Primary Examiner* — Jessica Whiteley
(74) *Attorney, Agent, or Firm* — Lerner, David, Littenberg, Krumholz & Mentlik, LLP

(57) ABSTRACT

An inkjet ink composition for 3D printing is disclosed herein. In some embodiments, the ink composition includes at least one radical curable compound selected from the group consisting of an acrylate-based monomer, an acrylate-based oligomer, and a vinyl-based monomer, and a light initiator, wherein the ink composition has dimensional precision an evaluation index of dimensional precision of 90% or more. The ink composition can implement a shape of a target sculpture more accurately by significantly reducing the flow of ink after a 3D printing process.

5 Claims, 2 Drawing Sheets

[Fig. 1A]
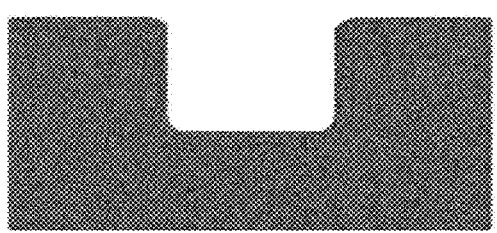
[Fig. 1B]
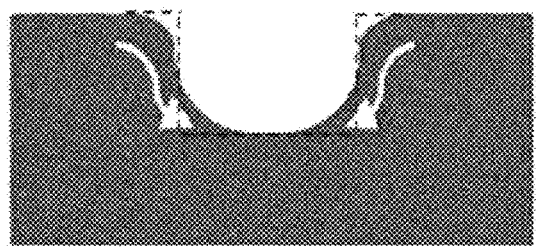
[Fig. 2A]
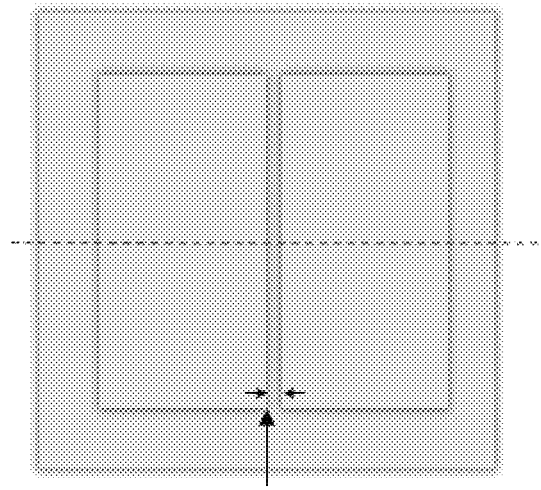
[Fig. 2B]
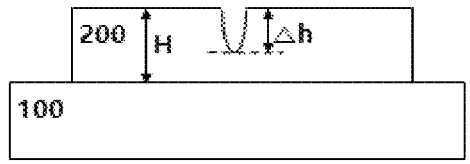

[Fig. 3A]
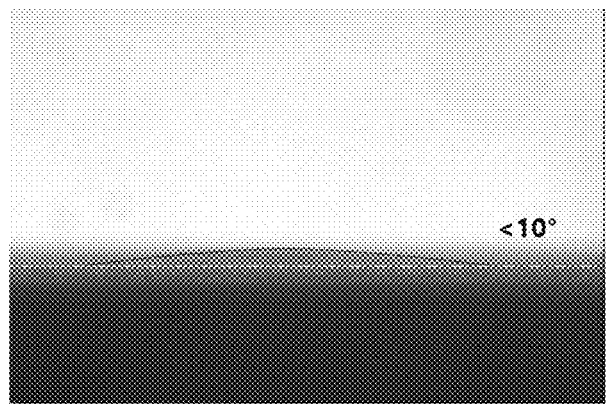
[Fig. 3B]
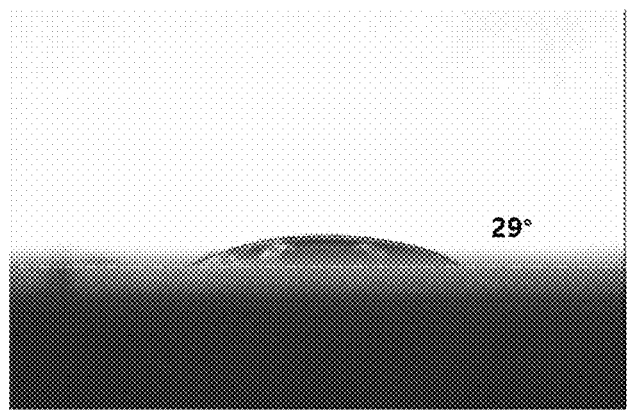

INKJET INK COMPOSITION FOR 3D PRINTING

CROSS-REFERENCE TO RELATED APPLICATION(S)

The present application is a national phase entry under 35 U.S.C. § 371 of International Application No. PCT/KR2018/016616, filed on Dec. 26, 2018, which claims priority from Korean Patent Application No. 10-2017-0179976, filed on Dec. 26, 2017, the disclosures of which are incorporated by reference herein.

BACKGROUND OF THE INVENTION

1. Field of the Invention

The present invention relates to an inkjet ink composition for 3D printing, and specifically to an inkjet ink composition for 3D printing which enables more precise representation of patterns.

2. Description of the Related Art

A 3D printer, which is a type of printer that prints a specific object in three dimensions, is a device that can produce real object in three-dimensional space like as printing three dimensional designs on paper. Like the principle of printing 2D images by ejecting inks onto the surface of the paper once a digitized file is transferred in an inkjet printer, in addition to motions in the front and back (x-axis) and left and right (y-axis) in the 2D printer, a 3D printer additionally moves up and down (z-axis) to produce three-dimensional objects based on the inputted 3D drawings.

Studies have been continued for an ink composition for 3D printing, which is a three-dimensional printing ink that allows these three-dimensional printers to form physical objects in three dimensions.

SUMMARY OF THE INVENTION

A problem to be solved by the present invention is to provide an inkjet ink composition for 3D printing which enables to reduce the flow of ink after printing to enable precise representation of patterns.

Another problem to be solved by the present invention is to provide a three-dimensional object made of the inkjet ink composition for 3D printing. In order to solve the problems of the present invention, there is provided an inkjet ink composition for 3D printing, comprising at least one radical curable compound selected from the group consisting of an acrylate-based monomer, an acrylate-based oligomer and a vinyl-based monomer, and a photoinitiator, wherein the ink composition having evaluation index of dimensional precision of 90% or more, the evaluation index (or steepness index) defined by Equation 1.

$$\text{Evaluation index of dimensional precision} = \Delta h / H * 100 \quad \text{[Equation 1]}$$

wherein,

H is a height of adjacent patterns separated by a portion between the patterns, the adjacent patterns printed in three dimensions with the ink composition, and Δh is a value representing a difference between H and hf, wherein hf is a height of the portion between the patterns, where the portion filled due to the flow of the ink composition.

According to one embodiment, the evaluation index of dimensional precision may be determined by a method comprising:

forming a first pattern with the ink composition for 3D printing;

curing the first pattern for 10 seconds;

forming a second pattern on the cured first pattern, the second pattern having the adjacent patterns separated by the portion; and curing the second pattern for 10 seconds, wherein H is a height of the second pattern, and Δh is a height change of the portion between the second patterns, the portion having a distance d between the adjacent patterns.

According to one embodiment, the ink composition for 3D printing may further comprise a silicone-based surfactant.

According to one embodiment, the photoinitiator may comprise an α-hydroxyketone-based photoinitiator or a phenylglyoxylate-based photoinitiator.

According to one embodiment, the ink composition for 3D printing may comprise an acrylphosphine-based photoinitiator and a silicone-based surfactant.

According to one embodiment, the ink composition for 3D printing may comprise the photoinitiator in an amount of 0.01 to 20 parts by weight based on 100 parts by weight of the total ink composition.

According to one embodiment, the ink composition for 3D printing may further comprise the silicone surfactant in an amount of 0.01 to 5 parts by weight based on 100 parts by weight of the total ink composition.

According to one embodiment, the acrylate-based oligomer may be a urethane acrylate-based oligomer and it may be present in an amount of 1 to 50 parts by weight based on 100 parts by weight of the total ink composition.

In order to solve another problem of the present invention, there is provided a three-dimensional object made of the ink composition for 3D printing.

EFFECT OF THE INVENTION

The present invention relates to an inkjet ink composition for 3D printing, comprising at least one radical curable compound selected from the group consisting of an acrylate-based monomer, an acrylate-based oligomer and a vinyl-based monomer, and a photoinitiator, wherein the ink composition having evaluation index of dimensional precision of 90% or more, as measured by the method according to the present invention. According to the present invention, the flow of ink after 3D printing process is significantly reduced, so that the shape of target object can be realized more precisely.

BRIEF DESCRIPTION OF THE DRAWINGS

FIG. 1A shows a three-dimensional object having dimensional precision.

FIG. 1B shows a three-dimensional object where the dimensional precision of the object is reduced by the flow of ink.

FIG. 2A shows a top down view of a structure of a sample for measurement of evaluation index of dimensional precision according to the present invention.

FIG. 2B shows a side view of the structure in FIG. 2A.

FIG. 3 shows a companion of the difference in surface tension of the ink composition with use of a silicone surfactant.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

A 3D printer, which is a type of printer that prints a specific object in three dimensions (as shown in FIG. 1A), is a device that can produce real object in three-dimensional space like as printing three dimensional designs on paper.

However, in inkjet 3D printing as shown in FIG. 1B, in a case after printing a three-dimensional object using the ink composition, the deformation and the reduced dimensional precision of the printed product may be occurred.

Therefore, in order to realize accurate implementation of the three-dimensional object in inkjet 3D printing, there is a need for studies on an ink composition which has a small flow of ink after printing.

In the present invention, in order to solve the problems of the prior art, there is provided an inkjet ink composition for 3D printing, comprising at least one radical curable compound selected from the group consisting of an acrylate-based monomer, an acrylate-based oligomer and a vinyl-based monomer, and a photoinitiator, wherein the ink composition having evaluation index (or steepness index) of dimensional precision of 90% or more, the evaluation index defined by Equation 1.

$$\text{Evaluation index of dimensional precision} = \Delta h / H * 100 \quad \text{[Equation 1]}$$

wherein,

H is a height of adjacent patterns separated by a portion between the patterns, the adjacent patterns printed in three dimensions with the ink composition, and $\Delta h$ is a value representing a difference between H and hf, wherein hf is a height of the portion between the patterns, wherein the portion is filled due to the flow of the ink composition.

More specifically, in the present invention, a sample having a structure as shown in FIG. 2A (top down view), and in FIG. 2B (side view), is manufactured and then the dimensional precision of the ink composition for 3D printing is evaluated by measuring a change in height of an empty space due to the ink composition flowing into the empty space, thereby quantifying the fluidity of the composition.

For example, the structure as shown in FIGS. 2A-B which is a sample for measurement of evaluation index of dimensional precision may be manufactured by a method comprising the steps of:

forming a first pattern 100 with the ink composition for 3D printing;

curing the first pattern 100 for 10 seconds;

forming a second pattern 200 on the cured first pattern 100, the second pattern 200 having adjacent patterns 202 and 204 separated by a portion 206, the second pattern 200 having a height H and the portion 206 having a distance d between the adjacent patterns 202, 204; and curing the second pattern 200 for 10 seconds.

$\Delta h$ and H in the Equation 1 are defined as follows.

$$\text{Evaluation index of dimensional precision} = \Delta h / H * 100 \quad \text{[Equation 1]}$$

wherein,

H is a height of the second pattern 200, and $\Delta h$ is a value representing a difference between H and hf, wherein hf is a height of the portion 206 between the adjacent patterns 202, 204, wherein the portion 206 is filled due to the flow of the ink composition.

In a method for manufacturing a three-dimensional object through inkjet 3D printing using an ink composition, the flow of ink after the printing process must be small for accurate implementation of the object. Accordingly, in the present invention, after forming a pattern in which an empty space is formed in a line form by intentionally not discharging several nozzles during inkjet coating, the degree of disappearance of the empty space by the flow of ink is quantified, and the dimensional accuracy is evaluated according to the Equation 1.

In addition, in order to obtain an index value which is independent of the kind of the substrate and evaluation in the condition similar to the actual 3D printing process, a first pattern 100 is first formed with the ink for 3D printing and then a second pattern 200 is formed thereon to understand the flow of ink.

For example, as shown in FIGS. 2A-B, the first pattern 100 is formed using an ink composition and then cured for 10 seconds, and the second pattern 200 having a height H and the portion having distance d between the adjacent patterns 202, 204 is formed on the cured first pattern 100 and then cured the second pattern 200 for 10 seconds. Then, a change in height of an empty space due to the ink composition flowing into the empty space is measured. Thereby, the fluidity of the ink can be determined. Further, by calculating it using the Equation 1, it can be used as an index for evaluating dimensional precision of the object produced by the ink composition.

According to one embodiment, in the 3D printed pattern which is manufactured for the evaluation index, the first pattern may be formed to have 200 to 1000 DPI and a dot pitch of 25 to 127 μm.

Also, the second pattern may be printed with a second pattern on the first pattern, wherein the distanced between the patterns may be 10 to 1000 μm, for example, 100 to 200 μm.

According to one embodiment, the curing process of the first pattern and the second pattern may be performed for 5 to 30 seconds with a light source of 300 to 500 nm.

As in the first and second patterns, the ink composition is applied in a three-dimensional manner to form a three-dimensional shape, and at the same time, UV light is irradiated to perform 3D printing. And a three-dimensional shape can be formed by curing through irradiation of the light.

The present invention provides an ink composition having evaluation index of dimensional precision of 90% or more, as measured by the method described above, in the production of an ink composition for 3D printing, whereby the flow of ink after printing is reduced and a more precise shape can be realized.

The ink composition for 3D printing according to the present invention may comprise a radical curable compound and a photoinitiator.

The radical curable compound comprises at least one selected from an acrylate-based monomer, an acrylate-based oligomer, and a vinyl monomer.

The ink composition according to the present invention can contain a monomer containing at least one of a vinyl group and an acrylate group to control curing sensitivity and control characteristics of the film such as strength of the cured product (softness or hardness).

According to one embodiment, the ink composition for 3D printing may comprise a mixture of a vinyl monomer and an acrylate monomer and an acrylate oligomer, and may control mechanical properties such as viscosity of the ink and strength of the cured product. The composition may comprise 1 to 50 parts by weight, preferably 1 to 40 parts by weight, based on 100 parts by weight of the total ink composition for 3D printing. When the acrylate oligomer is contained in an amount of less than 1 part by weight, the viscosity of the ink is lowered to 10 cP or less at 25° C., resulting in the flow of ink upon recoating and a large amount of satellite drop may occur during inkjet process. Also, when the acrylate oligomer is contained in an amount of more than 50 parts by weight, the viscosity of the ink becomes higher than 500 cP at 25° C., so that the inkjet process may become impossible even if the head is heated.

The monomer containing at least one of a vinyl group and an acrylate group is not particularly limited as long as it is used in the art, and for example, it may be at least one selected from the group consisting of vinyl acetate, 2-hydroxyethyl(meth)acrylate, 2-hydroxymethyl(meth)acrylate, 2-hydroxypropyl(meth)acrylate), 4-hydroxybutyl(meth)acrylate, 2-hydroxyethyl acrylate, 2-(acryloyloxy)ethyl hydrogen succinate and methacylic acid, 1,4-butanediol di(meth)acrylate, 1,3-butylene glycol di(meth)acrylate, 1,6-hexanediol di(meth)acrylate, 1,8-octanediol di(meth)acrylate, 1,12-dodecanediol di(meth)acrylate, neopentylglycol di(meth)acrylate, dicyclopentanyl di(meth)acrylate, cyclohexane-1,4-dimethanol di(meth)acylate, tricyclodecane dimethanol(meth)diacrylate, dimethylol dicyclopentane di(meth)acylate, neopentylglycol-modified trimethylpropane di(meth)acylate, adamantane di(meth)acylate, trimethylolpropane tri(meth)acrylate, isopropyl (meth)acylate, isobutyl (meth)acrylate, tertiary butyl (meth)acrylate or 2-ethylhexyl (meth)acrylate, cyclohexyl (meth)acylate, isobornyl (meth)acrylate, isobornyl acrylate (IBOA), phenoxyethyl acrylate (PEA), phenol acrylate, trimethylolpropane triacrylate (TM PTA), pentaerythritol triacrylate, trimethylenepropane triacrylate, pentaerythritol triacrylate, trimethylene propyl triacrylate, propoxylated glycerol triacrylate, N,N-dimethyl acrylamide (DMA), diacetone acrylamide (DAA), N-[3-(dimethylamino)propyl]methacrylamide (DMAPMA), N-methyl-N-vinylacetamide (NMNVA), 2-(dimethylamino)ethylacrylate (DMAEA), N-vinyl pyrrolidone (VP), 4-acryloylmorpholine (ACMO), N-methacryloylmorpholine, isopropyl acrylamide (IPAM), but is not limited thereto.

There is no particular limitation on the acrylate oligomer as long as it is used in the art, but the acrylate oligomer may include at least one selected from the group consisting of a urethane acrylate oligomer, a polyester acrylate oligomer and an epoxy acrylate oligomer, but is not limited thereto. Preferably, it may include a urethane acrylate oligomer.

There is no particular limitation on the photoinitiator to be used as long as it is used in the art in accordance with the light source, but the photoinitiator may include at least one photoinitiator selected from the group consisting of Irgacure 819 (bis acryl phosphine-based), Darocur TPO (mono acryl phosphine-based), Irgacure 369 (α-aminoketone-based), Irgacure184 (α-hydroxyketone-based), Irgacure 907 (α-aminoketone-based), Irgacure 2022 (bis acryl phosphine/α-hydroxyketone-based), Irgacure 2100 (phosphine oxide-based), Darocur ITX (isopropyl thioxanthone-based), Irgacure 500 (α-hydroxyketone-based), Irgacure 651 (benzyldimethyl-ketal-based), Darocur MBF (phenylglyoxylate-based), Darocur 1173 (α-hydroxyketone-based) or a photoinitiator having a similar structure thereto, preferably a acryl phosphine-based, α-hydroxyketone-based or phenylglyoxylate-based photoinitiator.

In the case of a composition containing an acryl phosphine-based photoinitiator, deep curing is excellent. However, upon recoating, a liquid may be applied on the uncured liquid, and the fluidity may be increased due to the homogeneous properties. Therefore, upon recoating for the uncured surface, the dimensional precision may be lowered due to the ink flow. Accordingly, it may be desirable that the acryl phosphine-based photoinitiator is used with a surfactant such as a silicone surfactant.

In the present invention, the photoinitiator may be included in an amount of 0.01 to 20% by weight, preferably 1 to 10% by weight, based on the total weight of the ink composition of the present invention. If the amount of the curing agent is less than 0.01% by weight, curing may not occur. If the amount of the curing agent is more than 20% by weight, the curing sensitivity is too high and the head may be clogged.

The ink composition for 3D printing according to the present invention may further comprise an additive in addition to the above components. Examples of the additive include a surfactant, a plasticizer, a polymerization inhibitor, an antifoaming agent, a diluent, a heat stabilizer, and a viscosity modifier.

The additive may be present in the minimum amount in which the action can be exerted economically, and preferably in an amount of 0.01 to 5 parts by weight based on 100 parts by weight of the total ink composition.

According to one embodiment, the ink composition may further comprise a silicone surfactant. The silicone surfactant does not directly participate in the curing reaction and is present at a high concentration on the surface after curing, thereby reducing the surface energy. As a result, it is possible to provide an ink composition having a small spreading property and, for example, an ink composition having a contact angle of 20° or more The silicone surfactant may be present in an amount of 0.01 to 5 parts by weight based on 100 parts by weight of the total ink composition. If the content of the silicone surfactant is less than 0.01 parts by weight, the effect of reducing surface energy after curing may not be exhibited. If the content of the silicone surfactant is more than 5 parts by weight, a large amount of bubbles may be generated, and inkjet processability may be deteriorated.

The silicone surfactant may include silicone series from BYK-Chemie, and for example it may be at least one selected from the group consisting of BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341v344, BYK-345v346, BYK-348, BYK-354, BYK-355, BYK-356, BYK-358, BYK-361, BYK-370, BYK-371, BYK-373, BYK-375, BYK-380, BYK-390 and a compound having a similar structure thereto.

According to one embodiment, the viscosity of the ink composition may be 10 cP or more, or 40 cP or more, preferably 50 cP or more at 25° C.

The present invention can provide an ink composition comprising the components as described above and having evaluation index of dimensional precision of 90% or more as measured by the above Equation 1. It results in a significant reduction in the ink flowability of the printed object, thereby realizing a more precise form of the three-dimensional object.

Hereinafter, embodiments of the present invention will be described in detail so that those skilled in the art can easily carry out the present invention. The present invention may, however, be embodied in many different forms and should not be construed as limited to the embodiments set forth herein.

Example 1

An ink composition comprising 20 parts by weight of ACMO, 35 parts by weight of IBOA, 20 parts by weight of TMPTA, 20 parts by weight of PU210 and 5 parts by weight of a photoinitiator (MBF) was stirred for 5 hours to prepare an ink composition for 3D printing.

Examples 2 to 8

An ink composition for 3D printing was prepared in the same manner as in Example 1 with the composition shown in Table 1 below.

Comparative Examples 1 to 4

An ink composition for 3D printing was prepared in the same manner as in Example 1 with the composition shown in Table 1 below.

Abbreviations used in the present invention are as follows.

ACMO: 4-Acryloylmorpholine, a monofunctional vinyl monomer

IBOA: Isobornyl acrylate, a monofunctional acrylate monomer

TMPTA: Trimethylolpropane triacrylate, a trifunctional acrylate monomer

PU210: Urethane acrylate oligomer from Miwon

TPO: 2,4,6-Trimethylbenzoyl-diphenylphosphine oxide, acrylphosphine-based photoinitiator from BASF MBF: Phenyl glyoxylic acid methyl ester, phenylglyoxylate-based photoinitiator from BASF I184: 1-hydroxy-cyclohexyl-phenyl-ketone, α-hydroxyketone-based photoinitiator from BASF BYK307: Silane series from BYK BYK333: Silane series from BYK BYK370: Silane series from BYK Experimental Example: Evaluation Method for Dimensional Precision Using the ink compositions for 3D printing prepared in Examples 1 to 8 and Comparative Examples 1 to 4, measurement samples were prepared as shown in FIGS. 2A-B and the dimensional precision of the ink composition was evaluated.

Specifically, a front pattern (400 DPI; dot pitch 63.5 μm) was formed (10 s) and then cured with 395 nm UV-LED to form a first pattern. Printing was performed on the first pattern by setting the distance d between the patterns to 191 μm while not discharging of one or two nozzles, followed by curing to form a second pattern. Table 1 shows the evaluation index values for dimensional precision obtained by calculating a difference between a height of the second pattern and a height of the portion filled due to the flow of ink.

TABLE 1

| | | Comparative Example | | | | Example | | | | | | | |
|---|---|---|---|---|---|---|---|---|---|---|---|---|---|
| | | 1 | 2 | 3 | 4 | 1 | 2 | 3 | 4 | 5 | 6 | 7 | 8 |
| Composition | ACMO | 20 | 20 | 20 | 10 | 20 | 20 | 20 | 20 | 20 | 20 | 20 | 20 |
| | IBOA | 54 | 39 | 69 | 19 | 35 | 38 | 38.8 | 38.8 | 38.8 | 34.8 | 45 | 22 |
| | TMPTA | 20 | 20 | 10 | 10 | 20 | 20 | 20 | 20 | 20 | 20 | 20 | 20 |
| | PU210 | 5 | 20 | 0 | 60 | 20 | 20 | 20 | 20 | 20 | 20 | 5 | 33 |
| | Photoinitiator | TPO 1 | TPO 1 | TPO 1 | TPO 1 | MBF 5 | I184 2 | TPO 1 | TPO 1 | TPO 1 | MBF 5 | MBF 5 | MBF 5 |
| | Silicone additive | — | — | — | — | — | — | BYK 307 | BYK 333 | BYK 370 | BYK 307 | — | — |
| | | 0 | 0 | 0 | 0 | 0 | 0 | 0.2 | 0.2 | 0.2 | 0.2 | 0 | 0 |
| Ink | Viscosity (cP@25° C.) | 20.5 | 68 | 9 | 2142 | 52.8 | 52 | 68 | 68 | 68 | 53 | 18 | 173 |
| Dimensional precision | Steepness index (%)(pattern distance (d): 191 μm) | 24.9 | 28.2 | — | — | 100 | 99 | 100 | 100 | 100 | 100 | 97 | 96 |

As can be seen from the results of Table 1, in Comparative Example 1 and Comparative Example 2 in which TPO, which is an acrylphosphine-based initiator, is used alone, the surface curing is not good and the fluidity is increased, so that the evaluation index of dimensional precision is extremely low. On the other hand, in Examples 3, 4 and 5 in which the same acrylphosphine-based initiator as Comparative Example 1 and Comparative Example 2 is used and a silicone surfactant, BYK 307, BYK 333 or BYK 370 is used together with TPO, the silicone surfactant is present at a high concentration on the surface after curing, the surface energy may be reduced. This may lower the fluidity of the ink composition and may increase the contact angle upon recoating. FIGS. 3A-B show the measurement of the contact angle upon re-coating with the ink composition of Comparative Example 2 and Example 3, respectively. The contact angle of Comparative Example 2 is 10° or less, whereas the contact angle of Example 3 shows 20° or more.

In Comparative Example 3 in which the acrylate oligomer is not included, a satellite drop is generated in a large amount during the ink jet process, and thus the dimensional precision cannot be measured.

In Comparative Example 4 in which the acrylate oligomer is contained in an excess amount of 50 parts by weight or more, the viscosity of the ink is excessively increased and thus the inkjet process is impossible.

Examples 1 and 2 and Examples 7 and 8 show that the use of a phenylglyoxylate-based initiator and α-hydroxyketone-based initiator improves surface curing of the ink composition, which can result in a high dimensional precision of 90% or more.

In Example 6 in which a silicone additive (BYK307) is added while changing the initiator to MBF, a phenylglyoxylate-based initiator, excellent dimensional precision can be exhibited.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. An ink composition for 3D printing, comprising:
 a monofunctional acrylate monomer, a trifunctional acrylate monomer, a urethane acrylate-based oligomer and a monofunctional vinyl-based monomer, a silicone-based surfactant, and a photoinitiator,
 wherein the photoinitiator is an α-hydroxyketone-based compound, a phenylglyoxylate-based compound, or an acrylphosphine-based compound, and is present in an amount of 0.01 to 20 parts by weight based on 100 parts by weight of the total ink composition,
 wherein the silicone surfactant is present in an amount of 0.01 to 5 parts by weight based on 100 parts by weight of the total ink composition,
 wherein the urethane acrylate-based oligomer is present in an amount of 1 to 50 parts by weight based on 100 parts by weight of the total ink composition, and
 wherein the ink composition having an evaluation index of dimensional precision of 90% or more,
 wherein the evaluation index defined by Equation 1:

$$\text{Evaluation index of dimensional precision} = \Delta h/H * 100 \quad \text{[Equation 1]}$$

wherein,
 H is a height of adjacent patterns separated by a portion between the patterns, the adjacent patterns printed in three dimensions with the ink composition, and
 $\Delta h$ is a value representing -a difference between H and hf, where hf is a height of the portion between the patterns, wherein the portion is filled due to the flow of the ink composition.

2. The ink composition for 3D printing according to claim 1, wherein the evaluation index of dimensional precision is determined by a method comprising:
 forming a first pattern with the ink composition;
 curing the first pattern for 10 seconds;
 forming a second pattern on the cured first pattern, the second pattern having the adjacent patterns separated by the portion; and
 curing the second pattern for 10 seconds.

3. The ink composition for 3D printing according to claim 1, wherein the photoinitiator is the α-hydroxyketone-based compound or the phenylglyoxylate-based compound.

4. The ink composition for 3D printing according to claim 1, wherein the photoinitiator is the acrylphosphine-based compound.

5. A three-dimensional object made of the ink composition for 3D printing according to claim 1.

* * * * *